(12) United States Patent
Yatake

(10) Patent No.: US 7,229,489 B2
(45) Date of Patent: Jun. 12, 2007

(54) WATER-COLOR INK COMPOSITION

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/179,061

(22) Filed: Jul. 11, 2005

(65) Prior Publication Data

US 2006/0016370 A1  Jan. 26, 2006

(30) Foreign Application Priority Data

Jul. 23, 2004  (JP) ............................. 2004-215335

(51) Int. Cl.
  *C09D 11/00*  (2006.01)
(52) U.S. Cl. ............................... 106/31.58; 106/31.86; 106/31.49; 106/31.78; 106/31.59; 106/31.89; 106/31.75; 106/31.43
(58) Field of Classification Search ............ 106/31.58, 106/31.86, 31.49, 31.78, 31.59, 31.89, 31.75, 106/31.43
See application file for complete search history.

(56) References Cited

U.S. PATENT DOCUMENTS

| 2,083,372 | A |  | 6/1937 | Gusthmann |
| 5,141,556 | A | * | 8/1992 | Matrick ....................... 524/385 |
| 5,156,675 | A |  | 10/1992 | Breton et al. |
| 5,183,502 | A |  | 2/1993 | Meichsner et al. |
| 5,196,056 | A |  | 3/1993 | Prasad |
| 5,772,746 | A | * | 6/1998 | Sawada et al. ........... 106/31.86 |
| 6,341,856 | B1 | * | 1/2002 | Thompson et al. ......... 347/100 |
| 6,783,581 | B2 | * | 8/2004 | Shen et al. ............... 106/31.86 |
| 6,942,723 | B2 | * | 9/2005 | Yatake et al. ............ 106/31.78 |
| 2003/0106462 | A1 | * | 6/2003 | Yatake et al. ............ 106/31.59 |
| 2005/0235870 | A1 | * | 10/2005 | Ishihara ................... 106/31.58 |

FOREIGN PATENT DOCUMENTS

| JP |  56-147861 | 11/1981 |
| JP |  09-111165 |  4/1997 |
| JP | 2000-154227 |  6/2000 |

OTHER PUBLICATIONS

Patent Abstracts of Japan of JP 56-147861 dated Nov. 17, 1981.
JPO computer English translation and Patent Abstracts of Japan of JP 09-111165 dated Apr. 28, 1997.
JPO computer English translation and Patent Abstracts of Japan of JP 2000-154227 dated Jun. 6, 2000.

* cited by examiner

*Primary Examiner*—Helene Klemanski
(74) *Attorney, Agent, or Firm*—Ladas and Parry LLP

(57) ABSTRACT

A water-color ink with which a high print quality can be obtained on ordinary paper, recycled paper or coated paper, and which has excellent storage stability. The water-color ink includes at least a color material and 2-butyl-2-ethyl-1,3-propanediol.

22 Claims, No Drawings

WATER-COLOR INK COMPOSITION

BACKGROUND

The present invention relates to a water-color ink which provides high print quality on ordinary paper, recycled paper and coated paper, and which has excellent storage stability.

Inkjet recording is a method of recording letters and graphics on the surface of a recording medium by discharging ink as droplets from a fine nozzle. Inkjet recording systems which are in practical use include a method of converting an electrical signal into a mechanical signal using an electrostrictive element to intermittently discharge ink stored in a nozzle head part and record letters and symbols on the surface of a recording medium, and a method of rapidly heating that part of the ink stored in a nozzle head part which is closest to the ejection part to produce bubbles, and intermittently discharging the ink by means of the volume expansion caused by the bubbles to record letters and symbols on the surface of a recording medium.

Properties required of the inks used in such inkjet recording include absence of bleeding and good drying of the print on the paper which is the recording medium, the ability to print uniformly on a variety of recording medium surfaces, and absence of mixing of adjacent colors in multicolor printing including color printing.

In conventional inks and most inks which use pigments in particular, means of have been studied and put into practice of controlling wetting of the paper surface by the ink primarily by controlling permeability, and of ensuring print quality by confining the ink drops to near the paper surface.

However, with inks which are designed to control wetting of the paper there is a large difference in bleeding depending on the kind of paper, and in the case of recycled paper consisting of a mixture of various paper components in particular bleeding occurs due to differences in the wetting properties of the ink with respect to those different components. Moreover, with such inks it takes time for the print to dry, raising the issue of mixing of adjacent colors in the case of color printing and other multicolor printing, and in the case of inks which use pigments as coloring materials the pigments remain on the surface of the paper or the like, detracting from abrasion resistance.

To resolve such issues, efforts are being made to improve permeability of the ink into the paper, and research is being done into adding diethylene glycol monobutyl ether (U.S. Pat. No. 5,156,675, Specifications), adding Surfynol 465 (Nisshin Chemical), adding an acetylene glycol surfactant (U.S. Pat. No. 5,183,502, Specifications), or adding both diethylene glycol monobutyl ether and Surfynol 465 (U.S. Pat. No. 5,196,056, Specifications). The use of diethylene glycol ethers in inks is also being studied (U.S. Pat. No. 2,083,372, Specifications).

In the case of inks which use pigments, because it is generally difficult to improve the permeability of the ink while maintaining the dispersion stability of the pigment the selection of penetrating agents is small, and examples of a glycol ether combined with a pigment have heretofore included triethylene glycol monomethyl ether (Japanese Patent Application Laid-open No. S56-147861) and ethers of ethylene glycol, diethylene glycol or triethylene glycol (Japanese Patent Application Laid-open No. H9-111165) used with pigments.

However, conventional water-color inks have unsatisfactory print quality, with frequent bleeding when printed on ordinary paper such as PPC paper, and color density and color development have also been inadequate. Conventional dispersions have also been unstable, and adsorption-desorption is likely to occur in the presence of surfactants, glycol ethers and other substances with hydrophilic and hydrophobic parts, detracting from the storage stability of such water-color inks. In order to reduce bleeding in the paper ordinary water-color inks have required substances with hydrophilic parts and hydrophobic parts, such as surfactants and glycol ethers. Inks which lack these substances have inadequate permeability in paper, so for purposes of uniform printing the type of paper is limited, and the printed image is often adversely affected.

Moreover, when the sort of additives (acetylene glycol, acetylene alcohol or silicon surfactants, di(tri)ethylene glycol monobutyl ether, (di)propylene glycol monobutyl ether or 1,2-alkylene glycol or mixtures of these) used in the present invention are used in conventional dispersions long-term storage stability is not obtained, and because the ink has poor re-solubility the ink has been likely to dry and clog the nozzle of the ink jet head or the pen tip or the like of the writing instrument.

Moreover, in the case of pigments dispersed by such dispersants a dispersant residue remains in the ink, with the problem that the dispersant is released from the pigment without contributing sufficiently to dispersion and viscosity is increased. This high viscosity means that there are limits on the amount added to pigments and other coloring materials, and adequate image quality is not obtained particularly on ordinary paper.

SUMMARY

To resolve such issues, it is an object of the present invention to provide a water-color ink which has little bleeding and high color development on ordinary paper, which enables the production of inks having adequate color development as well as fixability on specialized papers, which also has excellent discharge stability for inkjet recording, and which can provide an adequate line width when printed.

The water-color ink of the present invention comprises at least a color material and 2-butyl-2-ethyl-1,3-propanediol.

The present invention provides the effect of enabling the production of a water-color ink which has little bleeding and high color development on ordinary paper, which enables the production of inks having adequate color development as well as fixability on specialized papers, which also has excellent discharge stability for inkjet recording, and which can provide an adequate line width when printed.

DETAILED DESCRIPTION

The water-color ink of the present invention is the result of exhaustive research in light of demands for such properties as little bleeding and high color development on ordinary paper, enabling the production of inks having adequate color development as well as fixability on specialized papers, and excellent discharge stability of the ink from inkjet heads in inkjet recording.

The water-color ink of the present invention comprises at least a color material and 2-butyl-2-ethyl-1,3-propanediol.

By including 2-butyl-2-ethyl-1,3-propanediol it is possible to obtain a water-color ink which has little bleeding and high color development on ordinary paper, which enables the production of inks having adequate color development as well as fixability on specialized papers, which also has excellent discharge stability of the ink in inkjet recording, and which can provide an adequate line width when printed.

In the present invention a color material is a substance having color molecules, and includes colorants, pigments and dyes. A dye, organic pigment or inorganic pigment can be used favorably as this color material.

For example, dyes that can be used are those classified as acid dyes, direct dyes, reactive dyes, developer dyes, sulfur dyes or food colorings on the color index, as well as colorants classified as oil colors and basic dyes. Examples of pigments for black ink include furnace black, lamp black, acetylene black, channel black and other carbon blacks (C.I. pigment black 7) as well as copper oxides, iron oxides (C.I. pigment black 11), titanium oxide and other metals and aniline black (C.I. pigment black 1) and other organic pigments, and for ink jet purposes carbon black is desirable because it is relatively low-density and resistant to precipitation in water. Those that can be used for color inks include C.I. pigment yellow 1 (fast yellow G), 3,12 (disazo yellow MA), 13, 14, 17, 24, 34, 35, 37, 42 (yellow iron oxide), 53, 55, 74, 81, 83 (disazo yellow HR), 93, 94, 95, 97, 98, 100, 101, 104, 108, 109, 110, 117, 120, 128, 138, 153 and 180, C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (iron oxide), 104, 105, 106, 108 (cadmium red), 112, 114, 122 (quinacridone magenta), 123, 146, 149, 166, 168, 170, 172, 177, 178, 179, 185, 190, 193, 202, 206, 209 and 219, C.I. pigment violet 19 and 23, C.I. pigment orange 36, C.I. pigment blue 1, 2, 15 (phthalocyanine blue R), 15:1, 15:2, 15:3 (phthalocyanine blue G), 15:4, 15:6 (phthalocyanine blue E), 16, 17:1, 56, 60 and 63 and C.I. pigment green 1, 4, 7, 8, 10, 17, 18, 36 and the like.

The added amount of these pigments in the water-color ink is preferably 0.5 to 30% by weight (hereunder simply "%" in some cases) for ink jet purposes, or more preferably 1.0 to 12%, but in the present invention the addition of 3% or more for purposes of obtaining adequate color development on PPC paper or other ordinary paper is described. Consequently, the most desirable added amount is at least 3% and no more than 12%. If less than 3% is added printing density cannot be ensured on ordinary paper, while if more than 12% is added the ink becomes more viscous and structural viscosity appears in the viscosity characteristics, which tends to detract from the discharge stability of the ink from the ink jet head.

The diameter of the pigment grains is preferably 1 μm or less, and a pigment consisting of grains 0.01 to 0.15 μm in size or more preferably 0.05 to 0.12 μm in size is most desirable.

A method using ultrasonic dispersion or a nanomizer, jet mill, bead mill, sand mill, roll mill, microfluidizer, ultimizer or the like can be used as the dispersion method, but preferably media-less dispersion with a jet mill, nanomizer, microfluidizer, ultimizer or the like is desirable because contamination is less.

Furthermore it is desirable that the aforementioned color material be an organic pigment or inorganic pigment which has been given excellent storage stability and discharge stability by being included in a polymer.

The present invention preferably comprises at least a color material and 2-butyl-2-ethyl-1,3-propanediol. In this way it is possible to ensure adequate print quality, storage stability, discharge stability, adequate line width when printed and clogging stability. The 2-butyl-2-ethyl-1,3-propanediol content is preferably at least 0.05% but no more than 3%. Below 0.05% there is less improvement in print quality. Above 3% the effect on print quality levels out and there is little effect when more is added. Also, stability may not be obtained in some cases when pigment dispersion is accomplished by adsorption of the polymer by the pigment.

A straight-chain or branched-chain 1,2-alkylene glycol with 4 to 10 carbon atoms can be used as the penetrating agent added at the same time, the added amount of which can be 1.5 to 5%. Below 1.5% there is more bleeding, detracting from print quality, while above 5% there is little improvement effect on permeability, print quality levels out, and there are likely to be problems from increased viscosity.

Moreover, color development on PPC and other ordinary paper can be ensured by using 5% or more when using pigment black 7 (carbon black), 3% or more when using a phthalocyanine pigment such as pigment blue 15:3 or 15:4, and 4% or more when using other pigments.

Furthermore, at least a surfactant is preferably added to the aforementioned water-color ink. The surfactant is preferably one or more selected from acetylene glycol surfactants, acetylene alcohol surfactants and silicon surfactants. By using these surfactants bleeding on ordinary paper can be further reduced and the line width on specialized paper can be adjusted appropriately.

It is desirable to include at least 0.1% and no more than 5% of one or more selected from the acetylene glycol surfactants, acetylene alcohol surfactants and silicon surfactants. In the case of inkjet inks and others with low viscosity, small dot sizes and dynamic behaviors, the added amount is preferably such as to achieve a dynamic surface tension of 40 mN/m or less. Bleeding is greater if dynamic surface tension exceeds 40 mN/m. Above 5% the effect on print quality levels out, and adding more only increases viscosity, making the ink is harder to use and more likely to adhere to the tip of the head, which is likely to disturb the printing. Below 0.1%, there is less improvement effect on print quality. An added amount of 0.15–2% is preferred.

Furthermore, at least a glycol ether is preferably added to the aforementioned water-color ink. These additions improve the drying properties of the printing, allowing high-speed printing in the case of inkjet recording in particular because even with continuous printing the previous printed part is not transferred to the surface of the next medium.

The aforementioned glycol ether is preferably an alkylene glycol with 10 or fewer repeating units and also an alkyl ether with 3 to 10 carbon atoms. Of these, di(tri)ethylene glycol monobutyl ether and/or (di)propylene glycol monobutyl ether are preferred. Moreover, the added amount of a substance consisting of one or more selected from the aforementioned di(tri)ethylene glycol monobutyl ether and (di)propylene glycol monobutyl ether is preferably at least 0.5% and no more than 30%. Below 0.5% there is less effect on permeability and print quality is not improved. Above 30% increased viscosity makes the ink harder to use, and adding more has no effect in improving print quality. At least 1% but no more than 15% is preferred.

Furthermore, at least one or more selected from the aforementioned acetylene glycol surfactants, acetylene alcohol surfactants and silicon surfactants and one or more selected from the aforementioned di(tri)ethylene glycol monobutyl ether and (di)propylene glycol monobutyl ether are added simultaneously. Simultaneously using an acetylene glycol and/or acetylene alcohol surfactant and one or more selected from di(tri)ethylene glycol monobutyl ether and (di)propylene glycol monobutyl ether is desirable for reducing bleeding and improving print quality on PPC and other ordinary papers.

Furthermore, it is desirable that the one or more selected from the aforementioned acetylene glycol surfactants, acetylene alcohol surfactants and silicon surfactants be in the amount of 0.1% and that the one or more selected from the aforementioned di(tri)ethylene glycol monobutyl ether and (di)propylene glycol monobutyl ether be in the amount of 1% or more. The one or more selected from the aforementioned acetylene glycol surfactants, acetylene alcohol surfactants and silicon surfactants has the effect of improving permeability in a small quantity. Therefore, print quality is further improved if this is in the amount of 0.5% or less and if the one or more selected from the aforementioned di(tri) ethylene glycol monobutyl ether and (di)propylene glycol monobutyl ether is in the amount of 1% or more.

Moreover, the polymer which contributes to dispersion of the aforementioned pigment is preferably one whose main component is one or more selected from the group consisting of the polyacrylic acid esters, styrene-acrylic acid copolymers, polystyrenes, polyesters, polyamides, polyimides, silicon-containing polymers and sulfur-containing polymers. Because the substance consisting of one or more selected from the acetylene glycol surfactants, acetylene alcohol surfactants and silicon surfactants, di(tri)ethylene glycol monobutyl ether and (di)propylene glycol monobutyl ether which is used in the present invention causes an adsorption-desorption reaction with the dispersing agents commonly used in dispersing agent dispersion, a phenomenon is likely to occur in which released dispersing agent becomes suspended in the ink and the printing is disturbed as a result. However, when proper dispersion is accomplished using the aforementioned polymer adsorption-desorption is unlikely to occur because the polymer stably includes the color material.

2-pyrrolidone is preferably added in the water-color ink of the present invention. Discharge stability is improved by the addition of 2-pyrrolidone. The added amount is preferably at least 1% but no more than 15%. Below 1% there is little improvement effect on discharge stability, while above 15% the improvement effect on discharge stability levels out, and a problem of increased viscosity is likely to occur. At least 1.5% but no more than 5% is preferred.

Because the water-color ink of the present invention is aqueous and likely to decay under normal circumstances, it is also desirable to add a preservative, and this preservative is preferably one or more selected from the alkyl isothiazolones, chloralkyl isothiazolones, benzo isothiazolones, bromonitro alcohols, oxazolidine compounds and chlorxylenol. An appropriate added amount is 0.01% to 1%. Below 0.01% there is little preservative effect, while more than 1% tends to detract from the dispersion stability of the color material. A preferred added amount is 0.02% to 0.3%. It is also desirable to add a rust-proofing agent in the water-color ink of the present invention, and this rust-proofing agent is preferably dicyclohexylammonium nitrate and/or benzotriazole. An appropriate added amount is 0.005% to 0.5%. Below 0.005% there is little rust-proofing effect, while more than 0.5% tends to detract from the dispersion stability of the color material. An added amount of 0.008% to 0.1% is preferred.

Moreover, in the water-color ink of the present invention a humectant is preferably added to prevent the ink from drying and blocking the front surface of the nozzle. This humectant is preferably a substance having two or more hydroxyl groups, and is more preferably one or more selected from glycerin, diethylene glycol, triethylene glycol, tetraethylene glycol and polyethylene glycols with a number average molecular weight of 400 or less, trimethylol (carbon number 6 or less) alkanes, aldoses, ketoses, and sugar-alcohols. Examples of aldoses, ketoses and sugar-alcohols are the monosaccharides and polysaccharides, and glucose, mannose, fructose, ribose, xylose, arabinose, lactose, galactose, aldonic acid, glucitose, maltose, cellobiose, sucrose, trehalose, maltotriose and other alginic acids and salts thereof, cyclodextrin and cellulose can be used. An appropriate added amount is 5% to 50%. Below 5% there is little humectant effect, while above 50% the humectant effect levels out and viscosity increases. An added amount of 8% to 25% is preferred.

Moreover, in the water-color ink of the present invention a chelating agent is preferably added, and this chelating agent is preferably ethylenediaminetetraacetic acid, hydroxyethylenediaminetriacetic acid, glycol ether diaminetetraacetic acid, nitrilotriacetic acid, hydroxyethyliminodiacetic acid, di(hydroxyethyl)glycine, diethylenetriamine pentaacetic acid, triethylenetetramine hexaacetic acid and salts thereof. An appropriate added amount is 0.005% to 1%. Below 0.005% there is little chelating effect, while above than 1% the chelating effect levels out and the dispersion stability of the color material tends to be less. An added amount of 0.01% to 0.3% is preferred.

In the inkjet recording ink of the present invention a variety of additives such as solubilizers, permeation controllers, viscosity adjusters, pH adjusters, solubilizers, antioxidants and mildew-proofing agents are added in some cases for purposes of shelf stability, stable discharge from the ink discharge head and the like.

Examples are given below

It is desirable to add a water-soluble glycol for purposes of controlling drying on the nozzle surfaces of ink jets and the like, and examples include ethylene glycol, diethylene glycol, triethylene glycol, propylene glycol, dipropylene glycol, tripropylene glycol, polyethylene glycol with a molecular weight of 200 or less, 1,3-propylene glycol, isopropylene glycol, isobutylene glycol, 1,4-butanediol, 1,3-butanediol, 1,5-pentanediol, 1,6-hexanediol, glycerin, meso-erythritol, pentaerythritol and the like.

In addition, those which are compatible with water and can improve the solubility of ink components and glycol ethers with low solubility with the water in the ink, those which can improve permeability with respect to a recording medium such as PPC paper and those which can be used to prevent clogging of the nozzle include ethanol, methanol, butanol, propanol, isopropanol and other alkyl alcohols with 1 to 4 carbon atoms, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methy-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, dipropylene glycol mono-n-butyl ether and other glycol ethers, formamide, acetamide, dimethyl sulfoxide, sorbitol, sorbitan, acetin, diacetin, triacetin and sulfolane, and these can be selected appropriately and used.

Other surfactants can also be added to an ink of the present invention for purposes of controlling permeability on media such as paper, specialized paper and the like. The surfactants added are preferably surfactants which are compatible with inks shown in these examples, and the most permeable and stable surfactants are preferred. Examples include amphoteric surfactants and nonionic surfactants. Amphoteric surfactants include lauryl dimethylaminoacetic acid betaine, 2-alkyl-N-carboxymethyl-N-hydroxyethyl imidazolinium betaine, coconut oil fatty acid amidopropyl dimethylaminoacetic acid betaine, polyoctylpolyaminoethyl glycine and other imidazoline derivatives. Nonionic surfactants include polyoxyethylene nonylphenyl ether, polyoxyethylene octylphenyl ether, polyoxyethylene dodecyl phenyl ether, polyoxyethylene alkyl allyl ether, polyoxyethylene oleyl ether, polyoxyethylene lauryl ether, polyoxyethylene alkyl ether, polyoxyalkylene alkyl ether, (polyoxypropylene polyoxyethylene alkyl ether) and other ethers, polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate, polyoxyethylene stearate and other esters, other fluorine alkyl esters, perfluoroalkylcarboxylic acid salts and other fluorine-containing surfactants and the like.

Moreover, pH adjusters, solubilizers and anti-oxidants include diethanolamine, triethanolamine, propanolamine, morpholine and other amines and denatured amines, potassium hydroxide, sodium hydroxide, lithium hydroxide and other inorganic salts, ammonium hydroxide, tetravalent ammonium hydroxides (tetramethyl ammonium and the like), potassium (hydrogen)carbonate, sodium (hydrogen)carbonate, lithium (hydrogen)carbonate and other carbonates and phosphates, N-methyl-2-pyrrolidone, urea, thiourea, tetramethylurea and other ureas, allophanate, methylallophanate and other allophanates, biuret, dimethylbiuret, tetramethylbiuret and other biurets, and L-ascrobic acid and salts thereof. Commercial anti-oxidants, ultraviolet absorbers and the like can also be used. Examples include Ciba-Geigy Tinuvin 328, 900, 1130, 384, 292, 123, 144, 622, 770 and 292, Irgacor 252 and 153, Irganox 1010, 1076 and 1035, MD1024 and the like and lanthanide oxides.

Viscosity adjusters include rosins, alginic acids, polyvinyl alcohol, hydroxypropyl cellulose, carboxymethyl cellulose, hydroxyethyl cellulose, methylcellulose, polacrylic acid salts, polyvinyl pyrrolidone, gum arabic starch and the like.

For fixing purposes it is desirable that the polymer which contributes to dispersion of the pigment be at least 0.5% in the case of an organic pigment. The hydrophobic groups in the substance making up this polymer should be at least one or more groups selected from the alkyl, cycloalkyl and aryl groups. Moreover, the hydrophilic groups in the aforementioned substance having hydrophilic functional groups should be at least a carboxyl group, sulfonic acid group, hydroxyl group, amino group or amide group or a base of these. Specific examples of such substances forming dispersion polymers which can be used include monomers or oligomers having acryloyl groups with double bonds, methacryloyl groups, vinyl groups or aryl groups. For example, styrene, tetrahydrofurfuryl acrylate, butylmethacrylate, (α, 2, 3 or 4)-alkylstyrene, (a, 2, 3 or 4)-alkoxystyrene, 3,4-dimethylstyrene, α-phenylstyrene, divinylbenzene, vinylnaphthalene, dimethylamino (meth)acrylate, dimethylaminoethyl (meth)acrylate, dimethylaminopropyl acrylamide, N,N-dimethylamino ethylacrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, other alkyl (meth)acrylates, methoxydiethylene glycol (meth)acrylate, meth(acrylates) of diethylene glycols or polyethylene glycols of ethoxy, propoxy or butoxy groups, cyclohexyl (meth)acrylate, benzyl (meth)acrylate, phenoxyethyl (meth)acrylate, isobornyl (meth)acrylate, hydroxyalkyl (meth)acrylate, other fluorine-containing, chlorine-containing and silicon-containing (meth)acrylates, (meth)acrylamide, maleic acid amide, (mono, di, tri, tetra, poly)ethylene glycol di(meth)acrylate when introducing a cross-linked structure in addition to the (meth)acrylic acid or other single function, (meth)acrylates of 1,4-butanediol, 1,5-pentanediol, 1,6-hexanediol, 1,8-octanediol, 1,10-decanediol and the like, trimethylol propanetri(meth)acrylate, glycerin (di,tri) (meth)acrylate, di(meth)acrylates of ethylene oxide addition products of bisphenol A or F, neopentylglycol di(meth)acrylate, pentaerythritol tetra(meth)acrylate, ipentaerythritol hexa(meth)acrylate and other compounds having acryl or ethacryl groups can be used.

Moreover, these polymers can also be added in the process so that the main component is one or more chosen from the group of polyacrylic acid esters, styrene-acrylic acid copolymers, polystyrene, polyesters, polyamides, polyimides, silicon-containing polymers and sulfur-containing polymers.

In addition to potassium persulfate and ammonium persulfate, the polymerization initiator can be a common initiator used in radical polymerization such as hydrogen persulfate, azobisisobutyronitrile, benzoyl peroxide, dibutyl peroxide, peracetic acid, cumene hydroperoxide, t-butyl hydroxyperoxide, paramenthane hydroxyperoxide or the like.

A chain transfer agent can be used in emulsion polymerization in the present invention. Examples include t-dodecylmercaptan as well as n-dodecylmercaptan, n-octylmercaptan, the xanthogens dimethylxanthogen disulfide and diisobutylxanthogen disulfide, and dipentene, indene, 1,4-cyclohexagene, dihydrofuran, xanthene and the like.

A highly stable water-color ink can be obtained through the use of the aforementioned dispersion. Moreover, 1,2-alkanediols with 6 carbon atoms which may be branched include 1,2-hexanediol, 4-methl-1,2-pentanediol, 3-methyl-1,2-pentanediol, 2-methyl-1,2-pentanediol, 1-methyl-1,2-pentanediol and 3,3-dimethyl-1,2-butanediol.

Polymer particles may be added in the present invention as an essential component. The added amount is at least 0.1% and no more than 10%. At least 1% and no more than 8% is preferable and at least 2% and no more than 6% is more preferable. Below 0.1% there is little effect on abrasion resistance, while above 10% the ink's viscosity increases, making it difficult to use as an ink for inkjet recording. Of these amounts, however, in the present invention an added amount of 2% or more is described, an amount at which it is particularly possible to obtain fixability, color development and other properties through the use of polymer particles.

Polymer particles are usually dispersed in water to form an emulsion. Substances forming polymer particles which can be used include not only styrene, tetrahydrofurfuryl acrylate and butyl methacrylate but also (α, 2, 3 or 4)-alkylstyrene, (α, 2, 3 or 4)-alkoxystyrene, 3,4-dimethylstyrene, α-phenylstyrene, divinylbenzene, vinylnaphthalene, dimethylamino (meth)acrylate, dimethylaminoethyl (meth)acrylate, dimethylaminopropyl acrylamide, N,N-dimethylamino ethylacrylate, acryloylmorpholine, N,N-dimethylacrylamide, N-isopropylacrylamide, N,N-diethylacrylamide, methyl (meth)acrylate, ethyl (meth)acrylate, propyl (meth)

acrylate, ethylhexyl (meth)acrylate, other alkyl (meth)acrylates, methoxy diethylene glycol (meth)acrylate, meth(acrylates) of diethylene glycols or polyethylene glycols of ethoxy, propoxy or butoxy groups, cyclohexyl (meth)acrylate, benzyl (meth)acrylate, phenoxyethyl (meth)acrylate, isobornyl (meth)acrylate, hydroxyalkyl (meth)acrylate, other fluorine-containing, chlorine-containing and silicon-containing (meth)acrylates, (meth)acrylamide, maleic acid amide, (mono, di, tri, tetra, poly)ethylene glycol di(meth)acrylate when introducing a cross-linked structure in addition to the (meth)acrylic acid or other single function, (meth)acrylates of 1,4-butanediol, 1,5-pentanediol, 1,6-hexanediol, 1,8-octanediol, 1,10-decanediol and the like, trimethylol propanetri(meth)acrylate, glycerin (di,tri)(meth)acrylate, di(meth)acrylates of ethylene oxide addition products of bisphenol A or F, neopentyl glycol di(meth)acrylate, neopentyl glycol di(meth)acrylate, pentaerythritol tetra(meth)acrylate, dipentaerythritol hexa(meth)acrylate and the like.

In addition to sodium lauryl sulfate and potassium lauryl sulfate, anionic surfactants, nonionic surfactants and amphoteric surfactants can be used as emulsifiers for forming such polymer particles, and a surfactant which can be added to the aforementioned ink can be used. In addition to potassium persulfate and ammonium persulfate, hydrogen persulfate, azobisisobutyronitrile, benzoyl peroxide, dibutyl peroxide, peracetic acid, cumene hydroperoxide, t-butyl hydroxyperoxide, paramenthane hydroxyperoxide or the like can be used as the polymerization initiator. Either t-dodecylmercaptan or n-dodecylmercaptan, n-octylmercaptan, the xanthogens dimethylxanthogen disulfide and diisobutylxanthogen disulfide, dipentene, indene, 1,4-cyclohexagene, dihydrofuran, xanthen or the like can be used as the chain transfer agent for polymerization.

EXAMPLES

Next, specific examples and the like are explained using an ink for inkjet recording as an example. In the following a pigment is used as the color material and is included in a polymer, but there are no problems in cases in which a dye is used as the color material or the pigment is not included in a polymer.

(Manufacture of Pigment Dispersion)

First, the carbon black Monarch 880 (Cabot) is used for dispersion 1. Nitrogen is substituted in a reaction container equipped with an agitator, a thermometer, a circulation pipe and a drip funnel, 20 parts styrene, 5 parts α-methylstyrene, 15 parts butyl methacrylate, 10 parts lauryl methacrylate, 2 parts acrylic acid and 0.3 parts t-dodecylmercaptan and placed therein and heated to 70° C., and a separately prepared 150 parts styrene, 15 parts acrylic acid, 50 parts butyl methacrylate, 1 part t-dodecylmercaptan, 20 parts methyl ethyl ketone and 3 parts azobisisobutyronitrile are placed in the drip funnel and dripped into the reaction container over the course of 4 hours to accomplish a polymerization reaction of the dispersion polymer. Next, methyl ethyl ketone is added to the reaction container to prepare a dispersion polymer solution with a concentration of 40%.

40 parts of the aforementioned dispersion polymer solution is mixed with 30 parts of the carbon black Monarch 880 (Cabot) which was pulverized for 1 hour in a Nanomizer (Yoshida Machine Industries), 100 parts of an 0.1 mol/L aqueous sodium hydroxide solution and 30 parts of methyl ethyl ketone, and agitated for 30 minutes in a homogenizer. Next, this is agitated for 1 hour after addition of 300 parts ion-exchanged water. Next, all of the methyl ethyl ketone and some of the water is removed using a rotary evaporator, the pH is adjusted to 9 by neutralization with 0.1 mol/L sodium hydroxide, and dispersion 1 with a 20% solid component (dispersion polymer and carbon black) is obtained by filtration with a membrane filter.

Dispersions 2 through 4 are obtained by similar methods. Pigment blue 15:4 (Clariant) is used in dispersion 2. Pigment red 122 (Clariant) is used in dispersion 3. Pigment yellow 74 (Clariant) is used in dispersion 4.

(Manufacture of Polymer Particle Solution)

A reaction container is provided with a drip apparatus, a thermometer, a water-cooled circulating condenser and an agitator, 100 parts of ion-exchanged water are placed therein, and 0.2 parts of the polymerization initiator potassium persulfate are added with agitation at 70° C. in a nitrogen atmosphere. A monomer solution consisting of 0.05 parts sodium lauryl sulfate, 5 parts styrene, 6 parts tetrahydrofurfuryl acrylate, 5 parts butyl methacrylate and 0.02 parts t-dodecylmercaptan added to 7 parts ion-exchanged water is dripped at 70° C. and reacted to prepare the primary substance. 2 parts of a 10% ammonium persulfate solution is added to this primary substance and agitated, a polymerization reaction is performed by further adding a reaction liquid consisting of 30 parts ion-exchanged water, 0.2 parts potassium lauryl sulfate, 30 parts styrene, 15 parts butyl methacrylate, 16 parts butyl acrylate, 2 parts methacrylic acid, 1 part polyethylene glycol 200 dimethacrylate and 0.5 parts t-dodecylmercaptan at 70° C. with agitation, the pH is neutralized to 8.5 with ammonia and an aqueous polymer particle solution with a 30% concentration is prepared by filtration with an 0.3 μm filter.

(Preparation of Aqueous Ink Solution 1)

| Aqueous ink solution 1 | Added amount (%) |
|---|---|
| 2-butyl-2-ethyl-1,3-propanediol | 3.0 |
| Olfine E1010 (Nisshin Chemical Industries) | 0.6 |
| 2-Pyrrolidone | 2.0 |
| Triethylene glycol | 2.0 |
| Trimethylol propane | 5.0 |
| Glycerin | 8.0 |
| Ethylenediaminetetraacetic acid 2Na salt | 0.02 |
| Benzotriazole | 0.01 |
| Methyl isothiazolone | 0.1 |
| Ion-exchanged water | 19.27 |

The above mixture is aqueous ink solution 1.

(Preparation of Ink Composition 2)

| Aqueous ink solution 2 | Added amount (%) |
|---|---|
| 2-butyl-2-ethyl-1,3-propanediol | 1.0 |
| Surfynol 104 (Nisshin Chemical Industries) | 0.2 |
| 2-Pyrrolidone | 2.0 |
| Triethylene glycol | 2.0 |
| Trimethylol propane | 5.0 |
| Glycerin | 10.0 |
| Nitrilotriacetic acid 2Na salt | 0.02 |
| Benzotriazole | 0.01 |
| Benzo isothiazolone | 0.1 |
| Ion-exchanged water | 19.77 |

The above mixture is aqueous ink solution 2.

Example 1

(Preparation of Ink Composition 1)

| Ink composition 1 | Added amount (% weight) |
|---|---|
| Dispersion 1 (105) | 37.5 |
| Aforementioned aqueous polymer particle solution | 14.0 |
| Aforementioned aqueous ink solution 1 | 40.0 |
| Triethanolamine | 0.8 |
| Ion-exchanged water | Remainder |

(Print Evaluation)

As the print evaluation, results for bleeding evaluated as print quality when letters were printed using an ink of ink composition 1 are shown in Table 1. Results are also shown in Table 1 for an ink having 2-butyl-2-ethyl-1,3-propanediol replaced by glycerin in ink composition 1, which was evaluated in the same way as Comparative Example 1. Print was evaluated using a Seiko-Epson EM-930C inkjet printer. The criterion for evaluating bleeding was absence of connection in the 8-dot character "shou" [in Japanese] written using Microsoft Word in fine mode on ordinary paper, with complete absence evaluated as "A", one connection as "B", 2 or 3 connections as "C" and 4 connections as "D". "Connection" here means that the ink had spread along the paper fiber, connecting the lines of the character "shou". The papers used in these evaluations were Conqueror, Favorit, Modo Copy, Rapid Copy, Epson EPP and Xerox 4024, which are commercially available in Europe, the U.S. and Japan.

TABLE 1

| | Paper 1 | Paper 2 | Paper 3 | Paper 4 | Paper 5 | Paper 6 |
|---|---|---|---|---|---|---|
| Example 1 | A | A | A | A | A | A |
| Example 2 | A | A | A | A | A | A |
| Example 3 | A | A | A | A | A | A |
| Example 4 | A | A | A | A | A | A |
| Example 5 | A | A | A | A | A | A |
| Example 6 | A | A | A | A | A | A |
| Example 7 | A | A | A | A | A | A |
| Example 8 | A | A | A | A | A | A |
| Comparative Example 1 | B | C | C | C | B | C |
| Comp. Example 2 | C | C | D | D | C | D |
| Comp. Example 3 | C | C | D | D | C | D |
| Comp. Example 4 | C | C | D | D | C | D |
| Comp. Example 5 | C | C | C | C | B | C |
| Comp. Example 6 | C | C | D | D | C | D |
| Comp. Example 7 | C | C | D | D | C | D |
| Comp. Example 8 | C | C | D | D | C | D |

Evaluated papers: Paper 1: Conqueror
Paper 2: Favorit
Paper 3: Modo Copy
Paper 4: Rapid Copy
Paper 5: EPSON EPP
Paper 6: Xerox 4024

(Evaluation of Color Development)

Color development was evaluated in terms of color density (OD) and glossiness of a material printed using an inkjet printer and ink composition 1, with the results shown in Table 2. The results shown for color density (OD) are measurements taken with a Gretag SPM50 color control system. The results for glossiness are measurements taken with a Konika-Minolta Multigloss 268 gloss meter at 20°. Color development was evaluated using a Seiko-Epson EM-930C inkjet printer. A sample solid printed using Seiko-Epson PM photographic paper in EM-930C photo mode without color correction was evaluated. As in the print evaluation, the results using the ink of Comparative Example 1 are also shown in Table 2.

TABLE 2

| | C* | OD | Glossiness |
|---|---|---|---|
| Example 1 | Not measured | 2.2 | 70 |
| Example 2 | 114 | 2.3 | 110 |
| Example 3 | 96 | 2.5 | 90 |
| Example 4 | 110 | 2.6 | 123 |
| Example 5 | Not measured | 2.3 | 75 |
| Example 6 | 118 | 2.4 | 112 |
| Example 7 | 102 | 2.5 | 95 |
| Example 8 | 112 | 2.7 | 124 |
| Comparative Example 1 | Not measured | 1.8 | 23 |
| Comparative Example 2 | 56 | 1.6 | 50 |
| Comparative Example 3 | 40 | 1.7 | 41 |
| Comparative Example 4 | 50 | 1.8 | 56 |
| Comparative Example 5 | Not measured | 1.9 | 31 |
| Comparative Example 6 | 55 | 1.7 | 49 |
| Comparative Example 7 | 42 | 1.8 | 42 |
| Comparative Example 8 | 56 | 1.8 | 54 |

Example 2

(Preparation of Ink Composition 2)

| Ink composition 2 | Added amount (% weight) |
|---|---|
| Dispersion 2 (85) | 22.5 |
| Aforementioned aqueous polymer particle solution | 5.0 |
| Aforementioned aqueous ink solution 1 | 40.0 |
| Ion-exchanged water | Remainder |

(Print Evaluation)

As the print evaluation, results for bleeding evaluated as print quality when letters were printed using an ink of ink composition 2 by the same methods as in Example 1 are shown in Table 1, along with results of a similar evaluation of an ink having 2-butyl-2-ethyl-1,3-propanediol replaced by glycerin in ink composition 2 as Comparative Example 2.

(Color Development Evaluation)

Color development was evaluated in terms of chroma (C*), color density (OD) and glossiness of material printed using an ink of ink composition 2 and an inkjet printer, with the results shown in Table 2. The results for development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 2 are also shown in Table 2.

Example 3

(Preparation of Ink Composition 3)

| Ink composition 3 | Added amount (% weight) |
|---|---|
| Dispersion 3 (90) | 27.5 |
| Aforementioned aqueous polymer particle solution | 5.0 |
| Aforementioned aqueous ink solution 1 | 40.0 |
| Ion-exchanged water | Remainder |

(Print Evaluation)

As the print evaluation, results for bleeding evaluated as print quality when letters were printed using an ink of ink composition 3 by the same methods as in Example 1 are shown in Table 1, along with results of a similar evaluation of an ink having 2-butyl-2-ethyl-1,3-propanediol replaced by glycerin in ink composition 3 as Comparative Example 3.

(Color Development Evaluation)

Color development was evaluated in terms of chroma (C*), color density (OD) and glossiness of material printed using an ink of ink composition 3 and an inkjet printer, with the results shown in Table 2. The results for color development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 3 are also shown in Table 2.

Example 4

(Preparation of Ink Composition 4)

| Ink composition 4 | Added amount (weight %) |
| --- | --- |
| Dispersion 4 (80) | 25.0 |
| Aforementioned aqueous polymer particle solution | 4.0 |
| Aforementioned aqueous ink solution 2 | 40.0 |
| Ion-exchanged water | Remainder |

(Print Evaluation)

As the print evaluation, results for bleeding evaluated as print quality when letters were printed using an ink of ink composition 4 by the same methods as in Example 1 are shown in Table 1, along with results of a similar evaluation of an ink having 2-butyl-2-ethyl-1,3-propanediol replaced by glycerin in ink composition 4 as Comparative Example 4.

(Color Development Evaluation)

Color development was evaluated in terms of chroma (C*), color density (OD) and glossiness of material printed using an ink of ink composition 4 and an inkjet printer, with the results shown in Table 2. The results for color development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 4 are also shown in Table 2.

Example 5

(Preparation of Ink Composition 5)

| Ink composition 5 | Added amount (weight %) |
| --- | --- |
| Dispersion 1 (105) | 15.0 |
| Aforementioned aqueous polymer particle solution | 15.0 |
| Aforementioned aqueous ink solution 1 | 40.0 |
| Triethanolamine | 0.9 |
| Ion-exchanged water | Remainder |

(Print Evaluation)

As the print evaluation, results for bleeding evaluated as print quality when letters were printed using an ink of ink composition 5 by the same methods as in Example 1 are shown in Table 1, along with results of a similar evaluation of an ink having 2-butyl-2-ethyl-1,3-propanediol replaced by glycerin in ink composition 5 as Comparative Example 5.

(Color Development Evaluation)

Color development was evaluated in terms of color density (OD) and glossiness of material printed using an ink of ink composition 5 and an inkjet printer, with the results shown in Table 2. The results for color development in terms of color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 5 are also shown in Table 2.

Example 6

(Preparation of Ink Composition 6)

| Ink composition 6 | Added amount (% weight) |
| --- | --- |
| Dispersion 2 (90) | 25.0 |
| Aforementioned aqueous ink composition 2 | 40.0 |
| Glycerin | 5.0 |
| Ion-exchanged water | Remainder |

(Print Evaluation)

As the print evaluation, results for bleeding evaluated as print quality when letters were printed using an ink of ink composition 6 by the same methods as in Example 1 are shown in Table 1, along with results of a similar evaluation of an ink having 2-butyl-2-ethyl-1,3-propanediol replaced by glycerin in ink composition 6 as Comparative Example 6.

(Color Development Evaluation)

Color development was evaluated in terms of chroma (C*), color density (OD) and glossiness of material printed using an ink of ink composition 6 and an inkjet printer, with the results shown in Table 2. The results for color development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 6 are also shown in Table 2.

Example 7

(Preparation of Ink Composition 7)

| Ink composition 7 | Added amount (% weight) |
| --- | --- |
| Dispersion 3 (90) | 25.0 |
| Glycerin | 5.0 |
| Aforementioned aqueous ink composition 2 | 40.0 |
| Ion-exchanged water | Remainder |

(Print Evaluation)

As the print evaluation, results for bleeding evaluated as print quality when letters were printed using an ink of ink composition 7 by the same methods as in Example 1 are shown in Table 1, along with results of a similar evaluation of an ink having 2-butyl-2-ethyl-1,3-propanediol replaced by glycerin in ink composition 7 as Comparative Example 7.

(Color Development Evaluation)

Color development was evaluated in terms of chroma (C*), color density (OD) and glossiness of material printed using an ink of ink composition 7 and an inkjet printer, with the results shown in Table 2. The results for color development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 7 are also shown in Table 2.

Example 8

(Preparation of Ink Composition 8)

| Ink composition 8 | Added amount (% weight) |
|---|---|
| Dispersion 4 (95) | 27.5 |
| Glycerin | 5.0 |
| Aforementioned aqueous ink composition 2 | 40.0 |
| Ion-exchanged water | Remainder |

(Print Evaluation)

As the print evaluation, results for bleeding evaluated as print quality when letters were printed using an ink of ink composition 8 by the same methods as in Example 1 are shown in Table 1, along with results of a similar evaluation of an ink having 2-butyl-2-ethyl-1,3-propanediol replaced by glycerin in ink composition 8 as Comparative Example 8.

(Color Development Evaluation)

Color development was evaluated in terms of chroma (C*), color density (OD) and glossiness of material printed using an ink of ink composition 8 and an inkjet printer, with the results shown in Table 2. The results for color development in terms of chroma (C*) and color density (OD) are measurements taken with a Gretag SPM50 color control system. The results for glossiness are measurements taken with a Konika-Minolta Multigloss 268 gloss meter at 20°. As in the case of print evaluation, the results using the ink of Comparative Example 8 are also shown in Table 2.

I claim:

1. A water-based ink comprising at least a color material and 2-butyl-2-ethyl-1,3-propanediol and further comprising a 1,2-alkylene glycol.

2. A water-based ink according to claim 1, further comprising a surfactant.

3. A water-based ink according to claim 1, further comprising a glycol ether.

4. A water-based ink according to claim 1, further comprising 2-pyrrolidone.

5. A water-based ink according to claim 1, further comprising a humectant.

6. A water-based ink according to claim 1, further comprising a chelating agent.

7. A water-based ink according to claim 1, further comprising a preservative.

8. A water-based ink according to claim 1, further comprising a rust-proofing agent.

9. A water-based ink according to claim 2, wherein said surfactant is one or more selected from acetylene glycol surfactants, acetylene alcohol surfactants and silicon surfactants.

10. A water-based ink according to claim 3, wherein said glycol ether is an alkylene glycol monoalkyl ether.

11. A water-based ink according to claim 10, wherein said alkylene glycol monoalkyl ether is an alkylene glycol with 10 or fewer repeating units and an alkyl ether with 5 to 10 carbon atoms.

12. A water-based ink according to claim 11, wherein said alkylene glycol monoalkyl ether is di(tri)ethylene glycol monobutyl ether and/or (di)propylene glycol monobutyl ether.

13. A water-based ink according to claim 1, wherein said 1,2-alkylene glycol is a straight-chain or branched-chain 1,2-alkylene glycol with 4 to 10 carbon atoms.

14. A water-based ink according to claim 5, wherein said humectant is a substance having two or more hydroxyl groups.

15. A water-based ink according to claim 14, wherein said substance having two or more hydroxyl groups is one or more selected from consisting of glycerin, diethylene glycol, triethylene glycol, tetraethylene glycol and polyethylene glycols with a number average molecular weight of 400 or less, trimethylol having 6 or fewer carbon atoms alkanes, aldoses, ketoses, and sugar-alcohols.

16. A water-based ink according to claim 6, wherein said chelating agent is ethylenediaminetetraacetic acid, hydroxyethylenediaminetriacetic acid, glycol ether diaminetetraacetic acid, nitrilotriacetic acid, hydroxyethyliminodiacetic acid, di(hydroxyethyl)glycine, diethylenetriamine pentaacetic acid, triethylenetetramine hexacetic acid and salts thereof.

17. A water-based ink according to claim 7, wherein said preservative is one or more selected from the group consisting of isothiazolones, alkyl isothiazolones, chloralkyl isothiazolones, benzo isothiazolones, bromonitro alcohols, oxazolidine compounds and chlorxylenol.

18. A water-based ink according to claim 8, wherein said rust-proofing agent is dicyclohexylammonium nitrate and/or benzotriazole.

19. A water-based ink according to claim 9, comprising at least one or more selected from the group consisting of acetylene glycol surfactants, acetylene alcohol surfactants and silicon surfactants and at least one or more selected from di(tri)ethylene glycol monobutyl ether, (di)propylene glycol monobutyl ether and a straight-chain or branched-chain 1,2-alkylene glycol with 4 to 10 carbon atoms.

20. A water-based ink according to claim 1, wherein said color material is an organic pigment or inorganic pigment.

21. A water-based ink according to claim 20, wherein said color material is an organic pigment or inorganic pigment and is included in a polymer.

22. A water-based ink according to claim 1, wherein the content of said 2-butyl-2-ethyl-1,3-propanediol is at least 0.05% by weight but no more than 3% by weight.

* * * * *